United States Patent [19]
Abramson et al.

[11] Patent Number: 5,838,975
[45] Date of Patent: Nov. 17, 1998

[54] METHOD FOR TESTING AND DEBUGGING COMPUTER PROGRAMS

[76] Inventors: David Andrew Abramson, 30 Trunole St., Coorparoo, Queensland; Rok Sosic, 3/23 Osterley Road, Carina, QLD 4152, both of Australia

[21] Appl. No.: 425,097

[22] Filed: Apr. 18, 1995

[30] Foreign Application Priority Data

Apr. 19, 1994 [AU] Australia .................. PM5196

[51] Int. Cl.⁶ ........................................... G06F 9/45
[52] U.S. Cl. ............................................. 395/704
[58] Field of Search ................... 395/701, 704, 395/705, 708

[56] References Cited

U.S. PATENT DOCUMENTS

| 5,408,660 | 4/1995 | Kitadate | 395/650 |
| 5,446,900 | 8/1995 | Kimelman | 395/700 |

OTHER PUBLICATIONS

Harrold, M. et al, "Data Flow Testing of Parallelized Code", IEE Software Maintenance Conference, pp. 272–281, Nov. 1992.

Steffen, J., "Experience with a Portable Debugging Tool", Software–Practice and Experience, vol. 14(4), pp. 323–334 (Apr. 1994).

Moher, T., "Provide: A Process Visualization and Debugging Environment", IEEE Transactions on Software Engineering, vol. 14, No. 6, Jun. 1988.

*Primary Examiner*—Emanuel Tood Voeltz
*Assistant Examiner*—Peter J. Corcoran, III
*Attorney, Agent, or Firm*—Van Cott, Bagley, Cornwall & McCarthy

[57] ABSTRACT

A computerized method of testing and debugging an executable behaviorally unknown computer program by dynamic comparison with an executable behaviorally known computer program. The method controls execution of each program and compares related variable values at selected breakpoints in each program. If the variable values are equal within a certain error range the method continues execution of each program. If there is a significant difference between the variable values the method reports a fault and allows the option of terminating or continuing the method.

14 Claims, 4 Drawing Sheets

METHOD FOR TESTING AND DEBUGGING COMPUTER PROGRAMS

Foreign priority is hereby claimed under Title 35, United States Code, section 119 of Australian patent application Serial No. PM5196, filed Apr. 19, 1994 under the terms of the Paris Convention for the Protection of Intellectual Property.

FIELD OF THE INVENTION

THIS INVENTION relates to a method of testing and debugging an executable behaviourally unknown computer program by comparing the behaviourally unknown computer program against an executable behaviourally known computer program. The invention is particularly useful, but not necessarily limited to, testing and debugging in which both programs have been compiled from the same source code or when both programs originate from similar algorithms having identical variable values at specific break points.

BACKGROUND OF THE INVENTION

Conventional software debugging tools allow a user to interrogate the state and control the execution of a computer program. Such debugging tools require the user to have knowledge of the correct operation of the program in order to analyse various states to thereby find errors. Unfortunately, this may be a problem when the program is poorly structured, sparsely documented or when non-descriptive variable names are used.

Once a computer program (behaviourally known program) has been debugged and operates correctly on one type of computer, having a particular compiler and operating system, there is no guarantee that the program will behave as required either compiled by a different compiler or when run in a different environment. Consequently, comparison methods have been developed in which the behaviourally known program, functioning in a desired manner, is compared with a program under test (behaviourally unknown program) having the same source origin as the behaviourally known program.

Comparison methods may also be used to test and debug programs originating from similar algorithms having identical variable values at specific break points. The currently available comparison methods are usually effected in an ad-hoc fashion in which respective program states are written to a file and subsequently compared manually or alternatively two debugging sessions are required to manually compare respective program states.

If the program states are written to a file, then a file comparison program is used to detect the differences. If the output is compared manually, the user must set breakpoints in the two programs, dump the variables manually, and then compare the values.

Further, a hybrid method has also been used in which two debugging sessions dump the values of the variables to a file after which a file comparison program is run to detect differences.

Although more efficient than conventional debugging tools, the above comparison debugging methods are relatively time consuming. Further, they do not directly display differences to a user nor do they not allow the user to interactively view either differences in program states or differences in specified variables.

SUMMARY OF THE INVENTION

It is an object of the invention to overcome or alleviate at least some of the problems with prior art comparison debugging methods associated with computer programs.

According to one aspect of the invention there is provided a computerised method for testing and debugging an executable behaviourally unknown computer program the method being effected upon one or more computers including the steps of:

(i) controlling execution of one or more instructions of an executable behaviourally known computer program and one or more instructions of an executable behaviourally unknown computer program;

(ii) comparing, upon completion of step (i), at least one variable value of the behaviourally known computer program with a variable value of the behaviourally unknown computer program; and (iii) outputting differences resulting from the comparing step (ii).

The method may be further characterised by the initial step of:

(iv) interacting with a user to select a number of the instruction(s) to be executed at step (i).

Alternatively, the method may include the initial step of:

(v) interacting with a user to select one or more break points for the behaviourally unknown computer program and the executable behaviourally known computer program, wherein the break points limit how many of the instruction(s) of the respective behaviourally known and behaviourally unknown computer program are executed at step (i).

Suitably, the behaviourally known and behaviourally unknown computer program may have been compiled from the same source code. Alternatively, may have originated from similar or identical algorithms in which both said algorithms, when functioning in a desired manner, have at least one identical said variable value at a selected break point.

Preferably, the method may be further characterised by allowing a user the choice of selecting variables the variable value of which is compared at comparing step (ii).

Suitably, the method may be further characterised by allowing a user the choice of selecting a threshold value for each of said variables.

Preferably, said threshold value has a default value.

Suitably, said threshold value may be common to all said variables. Alternatively, a different said threshold value may be suitably selected for at least two of said variables.

Suitably, the method may be further characterised by the behaviourally known computer program and behaviourally unknown computer program being executed on different computers. Preferably, the method is effected on a further computer on which neither the behaviourally known computer program or behaviourally unknown computer program are executed. More preferably, the method may be suitably effected on a computer which executes the behaviourally known computer program. Alternatively, the behaviourally known computer program and behaviourally unknown computer program may be executed on the same computer.

The method may also suitably include the step of:

(vii) interacting, after the step of displaying (iii), wherein the interacting allows the user to control the method such that steps (i) to (iii) are repeated. Alternatively, steps (i) to (iii) may be automatically repeated until either a difference results from step (iii) in the comparing of the at least one variable value of the behaviourally known computer program with the variable value of the behaviourally known computer program, or there are no more of the instruction(s) to be executed at step (i).

Preferably, the comparing step of (ii) may include the steps of:

(viii) subtracting said at least one variable value of the behaviourally known computer program with said at least one variable value of the behaviourally unknown computer program; and (viii) determining if a modulus resulting from the subtracting step (viii) is greater than a threshold value.

Preferably the at least one variable value of the behaviourally known computer program and the at least one variable value are both from a group type comprising:

integer, real, boolean or character.

Suitably, the method may be further characterised by the step of standardising the variables of said the behaviourally known computer program and behaviourally unknown computer program before the subtracting step (viii) is effected.

Preferably, the outputting step (iii) is effected upon a visual display unit.

BRIEF DESCRIPTION OF DRAWINGS

In order that the invention may be readily understood and put into practical effect, reference will now be made to preferred embodiments illustrated in the accompanying drawings in which.

DETAILED DESCRIPTION

Figure 1:
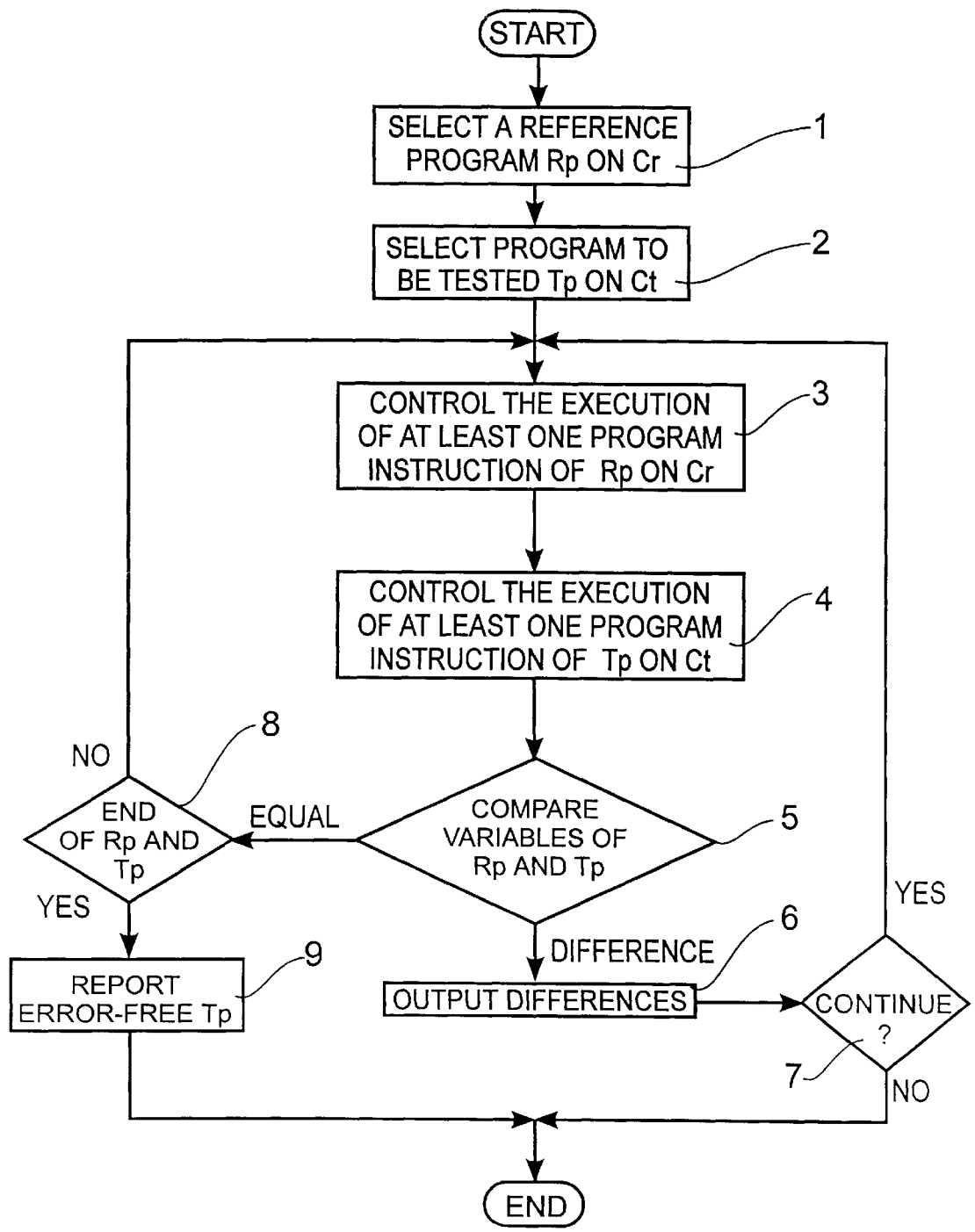
FIG. 1 is a flow diagram of a first embodiment of the invention.

Referring to FIG. 1 there is illustrated a comparison method for testing and debugging a computer program in which a user selects an executable behaviourally known computer program or reference program Rp to be executed on a computer Cr shown at step 1. The user also selects an executable behaviourally unknown computer program which is the program to be tested Tp, shown at step 2, in which Tp is to be executed on a computer Ct. Program Tp has been compiled from the same source code as the reference program Rp. Computers Cr and Ct are linked to communicate with each other and the selection of Rp and Tp includes the identification of their respective file paths or file locations.

Like conventional debugging tools, the comparison method of FIG. 1 requires information concerning variable or data types. On some operating systems variable or data types are embedded in a symbol table St associated with an executable image. Accordingly, if available, variable types are extracted from the symbol table. Alternatively, if no symbol table exists, then the user can input information concerning variable and data types thereby manually constructing symbol table St.

At step 3 at least one program instruction of Rp is then executed on Cr and a corresponding section of program instructions of Tp is executed on Ct at step 4.

By default a single program instruction is executed at each of steps 3 and 4. However, the user can determine the number of instructions to be executed at steps 2 and 3 or alternatively the user can select break points.

Values of variables of Rp and Tp are obtained (read) and then compared at step 5 by a comparison program on Cr. These variables may be selected by the user if so desired and by default all variables are selected. If a difference results, the differences are output at step 6 to the user by displaying the differences upon a visual display unit, outputting to a file or to any other output unit.

Certain errors such as inexact equality in floating point numbers are insignificant. Accordingly, the comparing of step 5 returns a compare flag set to DIFFERENCE only when the result of the comparison of the variables of Rp and Tp is greater than a threshold value Tv. Due to different computer environment data formats, such as two's complement versus sign magnitude, a translator is used to provide standardisation of the variable values to be compared. The threshold value Tv is set by the user and has a default value of 0. If the difference displayed at step 6 are insignificant the user may decide, at step 7, to continue debugging, at step 7, by selecting the Yes option. Alternatively, the user may terminate debugging, at step 7, by selecting the No option.

Referring back to step 5, if the result of the comparison of Rp and Tp is less than or equal to the threshold value then compare flag is returned set EQUAL. As a consequence, steps 3, 4 and 5 are repeated until step 8 results in a Yes which corresponds to there being no more executable program instructions. Accordingly, an error free Tp status is reported at step 9 to the user via the Visual Display Unit.

Figure 2:
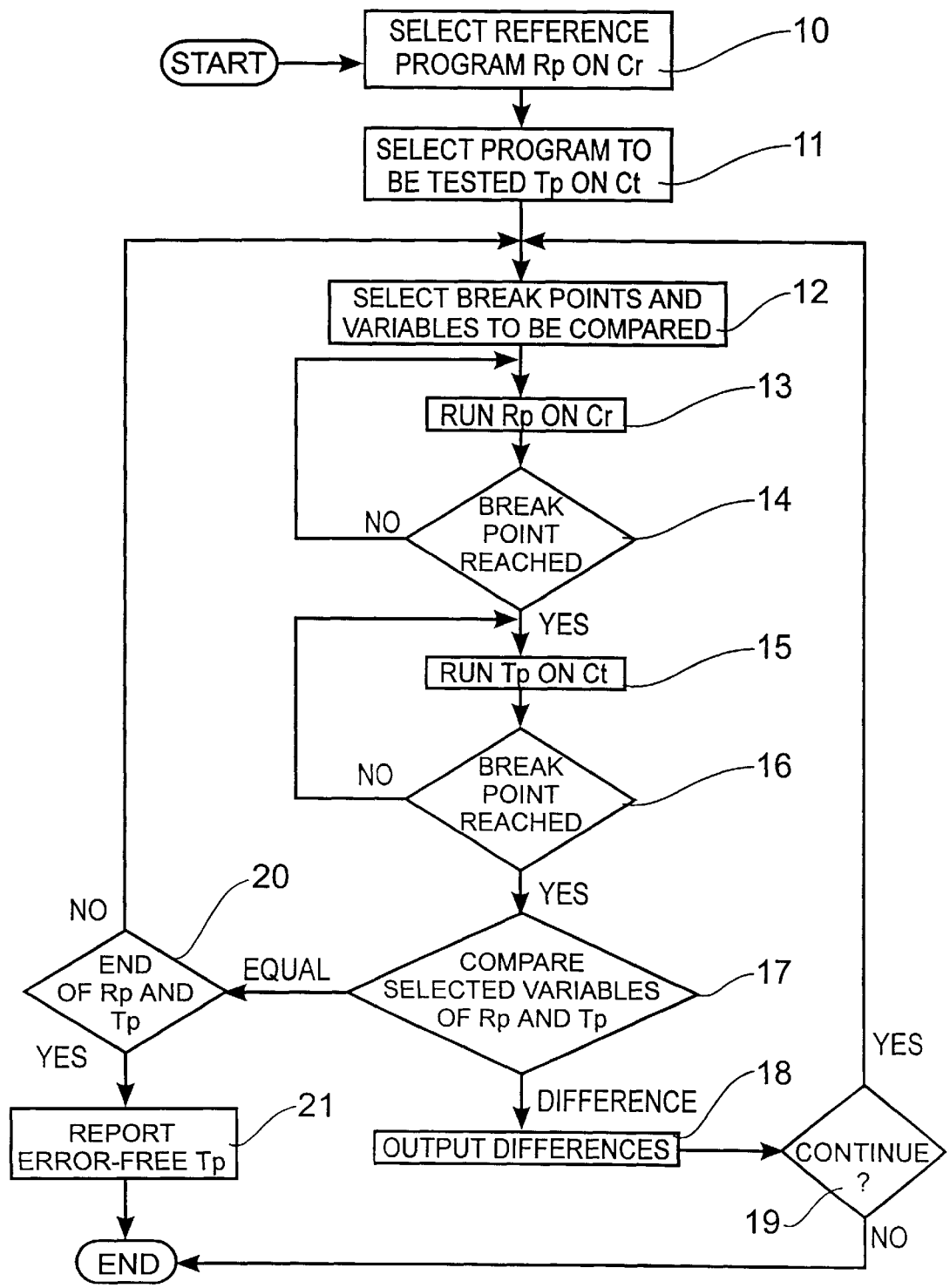
FIG. 2 is a flow diagram of a second embodiment of the invention.

Referring to FIG. 2 a flow diagram of a second preferred embodiment is shown in which the user selects the executable behaviourally known computer program or reference program Rp on computer Cr at step 10. An executable behaviourally unknown computer program which is the program to be tested Tp on computer Ct is selected at step 11. The respective paths of both Rp and Tp are also identified at steps 10 and 11 and as in FIG. 1 symbol table St is identified or created regarding variable and data types.

Break points and variables to be compared are selected by interaction with the user at step 12 and the user has the option of selecting a common threshold value Tv or individual threshold values for each selected variable. As discussed with reference to FIG. 1, the threshold value Tv which by default is 0 is used to reduce or eliminate the effects of inexact equality.

At step 13 Rp is run on Cr until step 14 detects a break point. Tp is then run on Ct at step 15 until step 16 detects a break point.

The values of the selected variables of Rp and Tp are obtained (read) and then compared at step 17 in which the comparison is executed on Cr. If the comparison results a comparison flag set to difference, the difference(s) are output to the user at step 18 by being displayed upon the Visual Display Unit or otherwise. The user may decide at step 19 to continue selecting break points and variables by selecting the Yes option. Alternatively, the testing and debugging session can be terminated by selecting the No option.

If at step 17 the comparison of the variables returns the comparison flag set to equal and the end test of Rp and Tp at step 20 results in a NO, the method returns to step 12. Alternatively, if at step 20 the result is YES then the end of both programs Rp and Tp have been reached and step 21 reports to the user, via the Visual Display Unit, that there are no errors in Tp and the method terminates.

Figure 3:
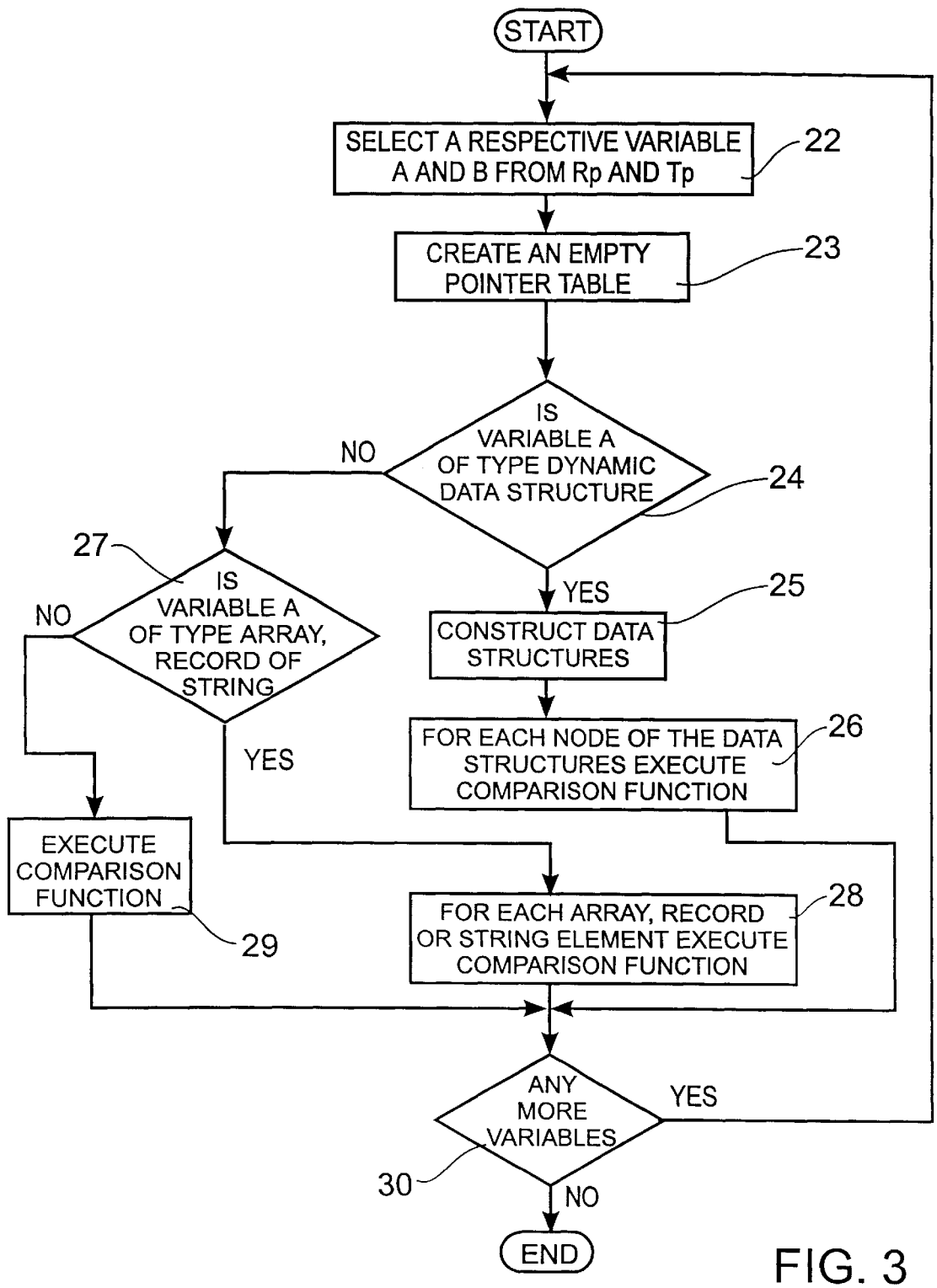
FIG. 3 is a flow diagram of a comparing step used in FIG. 1 and FIG. 2.

Referring to FIG. 3 there is illustrated the compare step (5 or 17) applicable both FIGS. 1 and 2.

At step 22 respective variables A and B are selected from Rp and Tp and an empty pointer table Pt for storing nodes of dynamic data structures is created at step 23. It should be noted that any standard method such as a linked list can be used to implement pointer table Pt.

Variable A is then tested at step 24 by reference to symbol table St to determine if it is of type dynamic data structure such as a pointer. If variable A is a dynamic data structure then at step 25 a graph of the data structures of both variables A and B is constructed and stored in pointer table Pt. At step 26 each respective node corresponding to one or more pointer table Pt storage locations is compared by the comparison function of FIG. 4 in which the data structure is compared in a depth first fashion, wherein a comparison of two respective nodes is determined by recursive searching until simple variable types are identified. These simple variable types are of type integer, real, boolean or character.

If at step 24 it is determined that variable A is not a dynamic data structure step 27 determines, by reference to symbol table St, whether or not variable A is an array, record or string. If variable A is an array, record or string then at step 28 each element of the array, record or string is compared by the comparison function of FIG. 4. However, as with dynamic data structures each element may be recursively searched until simple variable types can be compared.

If at step 27 it is determined that variable A is not an array, record or string then it is assumed that A is a simple variable type. Accordingly, the calculate function of FIG. 4 is executed once at step 29 to compare A and B.

If at step 30 it is determined that there are more variables to be tested the comparing method returns to step 22, otherwise the comparing method terminates and returns the comparison results to compare step 5 or 17.

Figure 4:
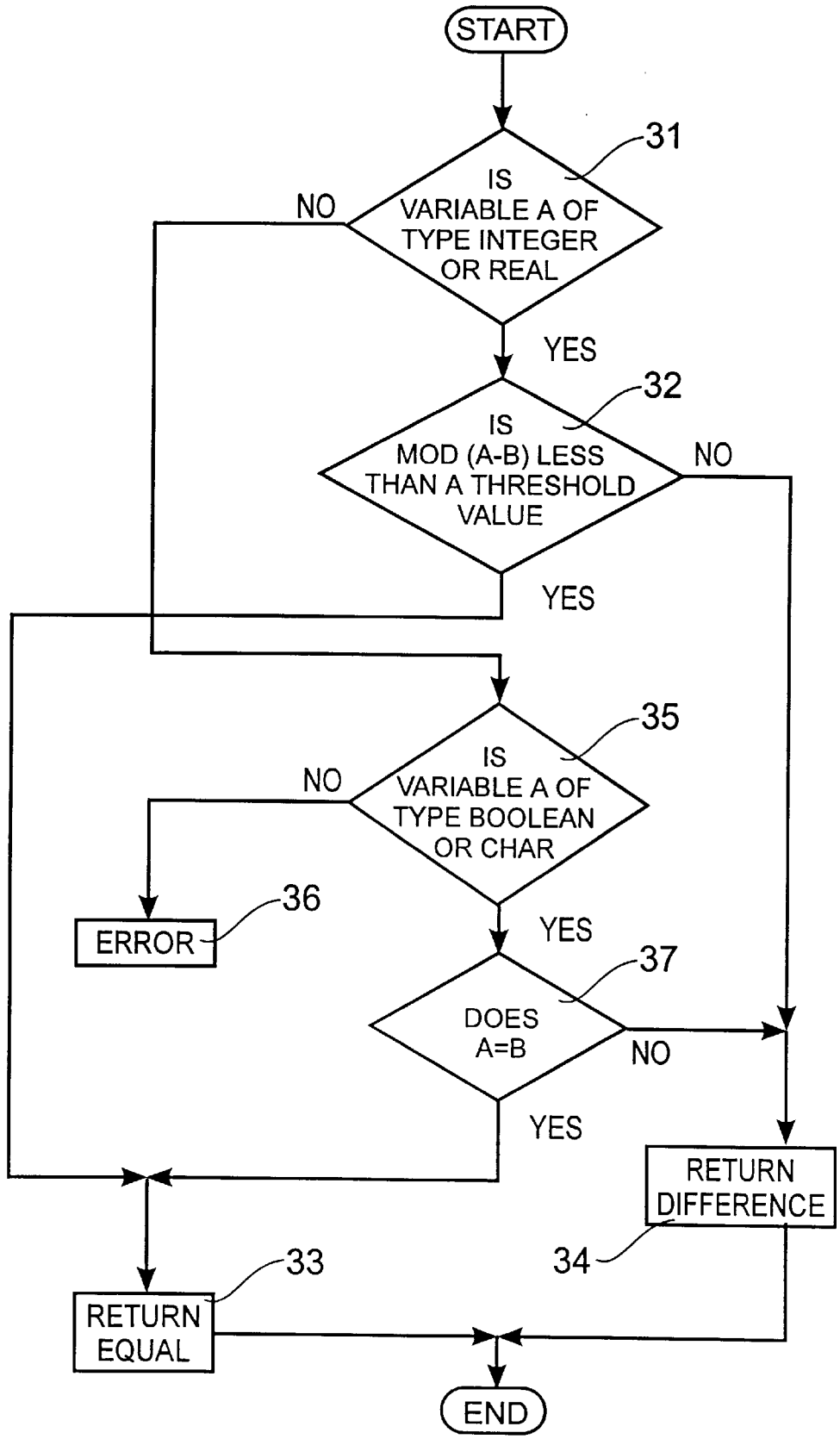
FIG. 4 is a flow diagram of a comparison function for simple types used in FIG. 3.

Referring to the comparison function of FIG. 4, step 31 checks if variable A is an integer or real number. If variable A is an integer or real number then at step 32 the value stored in variable B is subtracted from the value stored in variable A and the modulus of the result is compared against threshold value Tv. If the modulus of the result is less than or equal to threshold value Tv then A and B are considered equal and an equal condition is returned at step 33. If the modules of the result is greater than the threshold value a difference condition is returned at step 34.

At step 31, if variable A is neither an integer or real then step 35 checks if variable A is a boolean or character. If variable A is neither a boolean nor a character an error condition is detected at 36 which terminates the method. If variable A is either a boolean or character and step 37 determines that the value stored in variable A is equal to the value stored in variable B then an equal condition is returned at step 33. If the values of variables A and B are different then a difference condition is returned at step 34. After steps 33 or 34 the method terminates.

As an alternative to FIGS. 3 and 4 pseudo-code of Appendix I illustrates how the compare function of step 5 or step 17 can be implemented. Before calling the compare function respective variables A and B are selected from Rp and Tp. Further, an empty pointer Pt table is created for comparison of dynamic data structures.

As illustrated in Appendix I, variable parameters A,B are passed to function compare when called by either step 5 or 17. If A and B are simple variables (integer, floating point, boolean or character) as determined from symbol table St, then function simple_types_equal is called and the absolute value of B is subtracted from A. If this absolute value is less than or equal to threshold value Tv then function compare returns EQUAL at step 5 or 17, otherwise DIFFERENCE is returned.

Note the subtraction operator and less than operator have been overloaded so that it can test integers, booleans, floating points and characters.

If A and B are not simple variables then if they are of type array, as determined from symbol table St, function arrays_equal is called. Passed to function arrays_equal are variable array parameters A and B, starting positions for each array and a range of elements to be compared. The values of start_A, start_B and range may be user defined or calculated.

Further, because it is possible that arrays may be of different sizes (due to compilation differences or otherwise), elements between the maximum of the lower boundary and the minimum of the higher boundary are only considered. For example, if variable A is an array of elements A1 to A11 and variable B is an array of elements B0 to B9, then only elements E1 to E9 would be compared unless the user defines otherwise.

Upon entering function arrays_equal, local variable result of type boolean is set to TRUE after which respective locations of arrays A and B are compared by recursively calling functions compare. Accordingly, each element of the respective arrays A and B is recursively compared, wherein the recursive procedure backtracks after function simple_types_equal is called.

If A and B are of type record then function records_equal is called and local variable result which is of type boolean is set to TRUE. Each element of A to be compared is identified and compared with a corresponding element of B. By default corresponding element B is identified by element order or alternatively, the corresponding element may be identified by the user. Again, function compare is recursively called and backtracks when similar variable types are compared.

If variables A and B are type pointer then function pointers_equal is called to which variable parameters A, B are passed. This function inserts nodes into pointer table Pt in which, to prevent infinite searching of loops (pointer cycles), the current pointer values to which A and B point to are checked at step P1 to see if either pointer address is already in pointer table Pt. If the condition of step P1 is met then the condition at step P1.1 is determined which if met then equal is returned, else difference is returned.

Alternatively, if the condition of step P1 is not met a loop has not been found and steps P2 and P3 insert addresses pointed to by A and B into pointer table Pt thereby a graph of the data structures of A and B is constructed. Steps P4 and P5 then get the contents of the respective pointer's addresses (targets) and P6 recursively calls function compare. The steps P2 to P6 perform a similar function to steps 25 and 26 of FIG. 3. However, the step of 25 constructs the complete data structure of A and B before comparison step 26, whereas steps P2 to P6 store each node address and then the contents thereof are compared before any further nodes are compared.

It will be evident to a person skilled in the art that the pseudo_code allows for simple types to be compared directly whereas arrays and records are compared element by element. Each element may contain a further array or record which are also compared element by element.

Pointers are compared indirectly by comparing variables stored in address pointed to by the pointers. Function compare is recursive and searches an array, record or pointer in a depth first fashion in which backtracking only occurs when a simple type is reached and compared.

The above embodiments describe two methods for testing and debugging by comparing two programs running on different computers. In use a user can compare a behaviourally unknown program against a behaviourally known program. When differences are communicated (at step 6 or 18) the user can choose to ignore the differences and continue. However, if the

| PSEUDO-CODE |
| --- |
| function COMPARE(A,B) |
| *         COMPARE calculates if A and B are different |
| *         if A and B are different, it returns value |
| *         DIFFERENCE otherwise, it returns value EQUAL |
| C1.         If A and B are simple variables, then: |
| return (simple_types_equal (A,B)); |
|             ELSE |
| C2.         If A and B are arrays, then: |
| return (arrays_equal (A,B, start_A,start_B,range)); |
|             ELSE |
| C3.         If A and B are records, then: |
| return (records_equal (A,B)); |
|             ELSE |
| C4.         Return (pointers_equal (A,B)); |
| function simple_types_equal (A,B). |
| S1.         If abs (A-B) <= threshold_value then |
|                 return (EQUAL); |
|             ELSE |
| S2.             return (DIFFERENCE); |
| function arrays_equal (A,B,start_A,start_B,range) |
| A1.         result := TRUE; |
| A2          FOR I := O to range-1 DO |
| A2.1            result := result and |
|             (COMPARE (A[start_A+I],B[start_B+I]) = EQUAL); |
|                 END DO |
| A3.         If result = TRUE then return (EQUAL); |
|             ELSE |
| A4.         Return (DIFFERENCE); |
| function records_equal (A,B) |
| R1.         result := TRUE; |
| R2.         FOR EACH element i of A |
| R2.1            select_corresponding_element j in B; |
| R2.2            result := result and |
|                 (COMPARE(i,j) = EQUAL); |
|                 END FOR |
| R3.         If result = TRUE then return (EQUAL); |
|             ELSE |
| R4.         return (DIFFERENCE); |
| function pointers_equal (A,B) |
| P1.         If (A,Rp) or (B,Tp) is in the table, then: |
| P1.1            If (A,Rp) is in the table and (B,Tp) is |
|                 in the table, then return (EQUAL); |
|                 ELSE |
| P1.2            return (DIFFERENCE); |
| P2.         put (A,Rp) in the table; |
| P3.         put (B,Tp) in the table; |
| P4.         C := get the value of A's target; |
| P5.         D := get the value of B's target; |
| P6.         return (COMPARE (C,D)); | differences are significant then the user can save the selected break points and variables and edit the behaviourally unknown program. Further, if it is not readily apparent why there are differences, the user can select intermediate break points and other variables to assist in debugging.

The method as illustrated in FIGS. 1 and 2 are suitable for testing and debugging executable programs compiled from the same source code. The method as illustrated in FIG. 2 is also suitable for testing and debugging programs originating from identical of similar algorithms in which specific variables will be selected at break points. The methods as described are also suitable for testing and debugging programs running on the same computer, which may include parallel processors, in such a case Cr and Ct are the same computer. Further, if desired, the methods of FIGS. 1 and 2 may be executed on a third computer which is in communication with Cr and Ct.

Although, the flow diagrams show the computers Cr and Ct running sequentially, they can also run concurrently. Further, both the embodiments may further include a counter or timer for handling error conditions such as when one of the programs does not return from a break point or if an infinite loop is entered.

The invention has been described with reference to preferred embodiments, however, it is to be understood that the invention is not limited to the specific embodiments hereindescribed.

We claim:

1. A computerized method for dynamically testing and debugging an executable behaviorally unknown computer program in an environment including:
   a first computer, said first computer having at least a central processing unit, dynamic memory and a display apparatus;
   a second computer, said second computer having at least a central processing unit and dynamic memory; and
   communications apparatus linking said first computer to said second computer so that said first computer can communicate with said second computer;
   the invented method including the steps of:
   (i) said first computer executing at least one instruction of an executable behaviorally known computer program until a break point is reached;
   (ii) said first computer calculating at least one variable value at said break point;
   (iii) said second computer executing at least one instruction of an executable behaviorally unknown program until a break point is reached;
   (iv) said second computer calculating at least one related variable value at said break point;
   (v) said first computer ascertaining said variable values calculated by said second computer in step (iv) by use of said communications apparatus;
   (vi) said first computer determining the difference between said variable values of step (ii) and step (iv).

2. The method according to claim 1 further including the step of continuing execution of said behaviorally known computer program and said behaviorally unknown computer program until the next break point is reached.

3. The method according to claim 1 further including the step of halting execution of said behaviorally known computer program and said behaviorally unknown computer program if said at least one difference between said variable values exceeds a threshold and displaying said at least one difference.

4. The method according to claim 1 further including the step of displaying said at least one difference if said difference exceeds a threshold and continuing execution of said behaviorally known computer program and said behaviorally unknown computer program until the next break point is reached.

5. The method according to claim 1 further including the initial step of selecting said break points in said behaviorally known computer program and said behaviorally unknown computer program.

6. The method according to claim 1 further including the step of compiling said behaviorally known computer program and said behaviorally unknown computer program from the same source code.

7. The method according to claim 1 characterized by said behaviorally known computer program and said behaviorally unknown computer program originating from equivalent algorithms in which both said algorithms, when functioning in a desired manner, have at least one variable value at the break point identical within a threshold.

8. The method according to claim 1 including the initial step of a user selecting said at least one variable of said behaviorally known computer program and said at least one variable of said behaviorally unknown computer program.

9. The method according to claim 1 further including the step of a user selecting a threshold value for said at least one difference between said at least one variable values.

10. The method according to claim 1 wherein the step of dynamically comparing said variable valves further includes the steps of: calculating a modulus of the difference between said variable values; and determining if said modulus is greater than a threshold.

11. The method according to claim 10 further including the step of standardizing said at least one variable values of said behaviorally known computer program and said behaviorally unknown computer program before subtracting.

12. The method according to claim 1 further including the step of displaying said variable values.

13. A computerized method for dynamically testing and debugging an executable behaviorally unknown computer program in an environment including:

a first computer, said first computer having at least a central processing unit and dynamic memory;

a second computer, said second computer having at least a central processing unit and dynamic memory;

a third computer, said third computer having at least a central processing unit, dynamic memory and a display apparatus; and communications apparatus linking said first, second and third computers so that said first, second and third computers can communicate;

the invented method including the steps of:
　　(i) said first computer executing at least one instruction of an executable behaviorally known computer program until a break point is reached;
　　(ii) said first computer calculating at least one variable value at said break point;
　　(iii) said second computer executing at least one instruction of an executable behaviorally unknown program until a break point is reached;
　　(iv) said second computer calculating at least one related variable value at said break point;
　　(v) said third computer ascertaining said variable values calculated by said first computer in step (ii) and said second computer in step (iv) by use of said communications apparatus;
　　(vi) said third computer determining the difference between said variable values of step (ii) and step (iv).

14. A computerized method according to claim 13, further including the step of:
　　(vii) said third computer displaying a message on said display apparatus regarding the results of step (vi).

* * * * *